Aug. 16, 1927.
C. McPHERSON
1,639,143
POWER TRANSMITTING DEVICE
Filed July 9, 1926      3 Sheets-Sheet 1
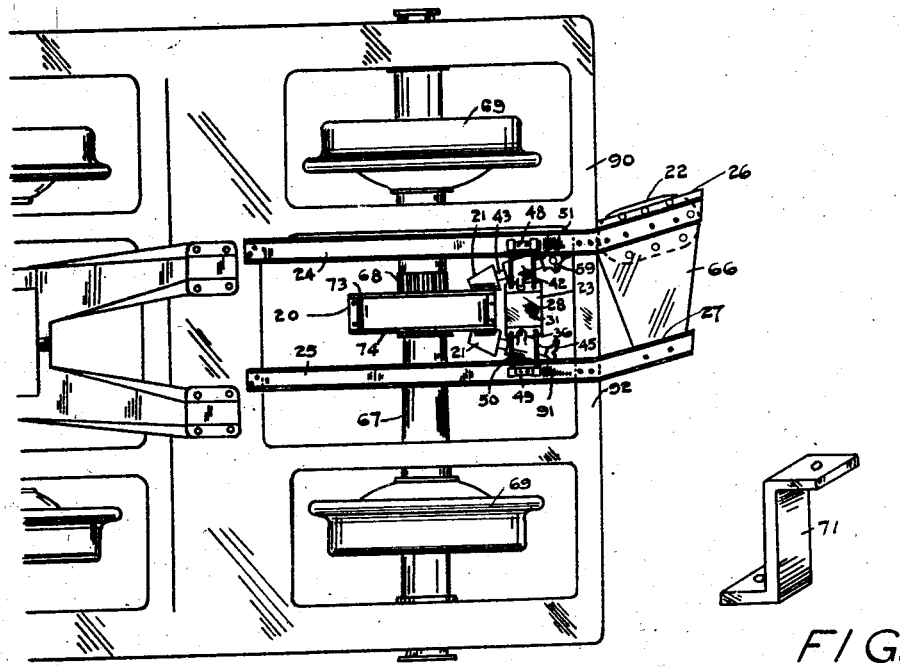
FIG. 1
FIG. 5.
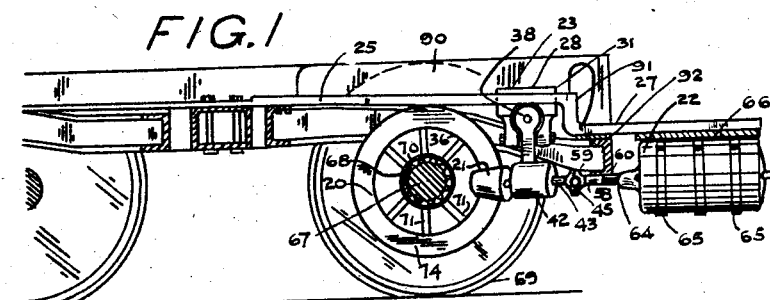
FIG. 2.
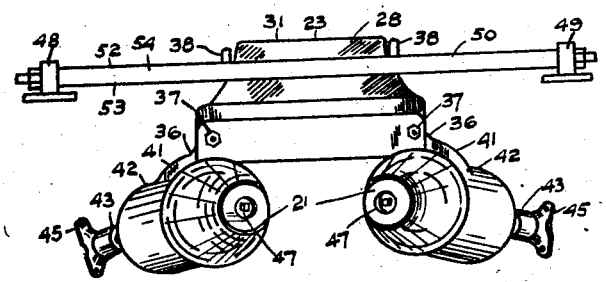
FIG. 3.
FIG 4
INVENTOR
C. McPherson
By E.J. Fetherstonhaugh
ATTY.

Aug. 16, 1927.
C. McPHERSON
1,639,143
POWER TRANSMITTING DEVICE
Filed July 9, 1926
3 Sheets-Sheet 2
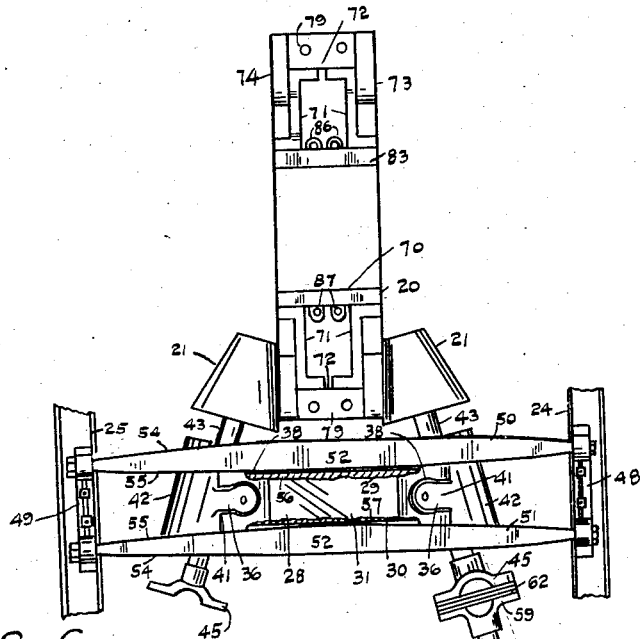
FIG. 6.
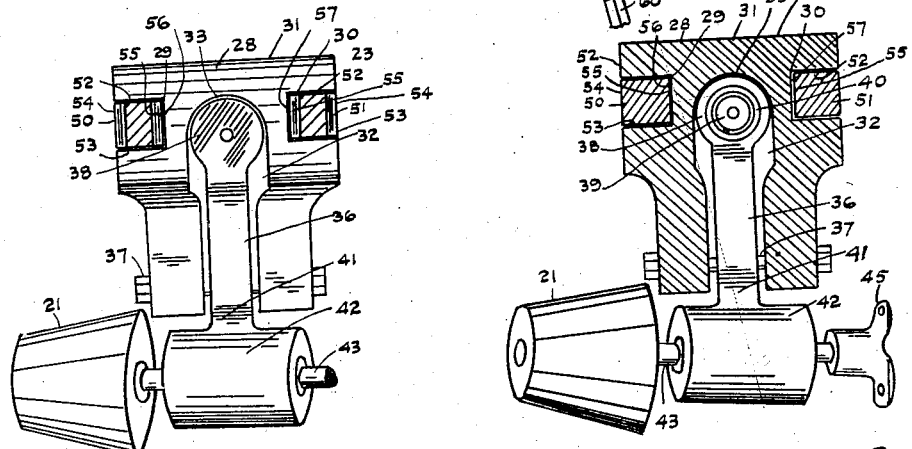
FIG. 7.
FIG. 8.
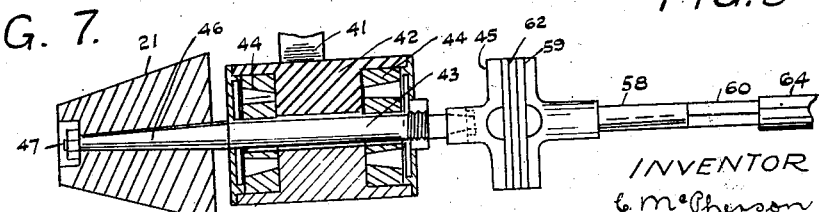
FIG. 9.
INVENTOR
C. McPherson
By E.J. Featherstonhaugh
ATTY.

Aug. 16, 1927.

C. McPHERSON

POWER TRANSMITTING DEVICE

Filed July 9, 1926

INVENTOR
C. McPherson
By E.J. Fetherstonhaugh
ATTY

Patented Aug. 16, 1927.

1,639,143

UNITED STATES PATENT OFFICE.

CHARLES McPHERSON, OF MONTREAL, QUEBEC, CANADA, ASSIGNOR, BY MESNE ASSIGNMENTS, TO FRICTION POWER CORPORATION LIMITED, OF MONTREAL, QUEBEC, CANADA.

POWER-TRANSMITTING DEVICE.

Application filed July 9, 1926. Serial No. 121,451.

The invention relates to a power transmitting device, as described in the present specification and illustrated in the accompanying drawings that form part of the same.

The invention consists essentially of the novel features of construction pointed out broadly and specifically in the claims for novelty following a description containing an explanation in detail of an acceptable form of the invention.

The objects of the invention are to transmit the maximum of power from a rotating member to the machine to be driven and particularly in this connection to benefit to the fullest extent mechanically possible from the rotation of a car axle in a steam railway passenger car in the driving of an electric generator used in lighting, heating, cooking, cooling or for any of the purposes to which electric current is applicable; to afford convenient access to the mechanism and all facilities for maintenance and repairs; to reduce the cost of lighting equipment and minimize expenditure on their upkeep; to insure a steady delivery of current to the translating devices; and generally to provide an efficient, durable and serviceable equipment at an economical price and with all the advantages of adaptability to modern methods in the installation.

In the drawings, Figure 1 is a plan view showing the application of the invention to a standard truck.

Figure 2 is a side elevation of the invention, showing the axle in cross section.

Figure 3 is an enlarged front elevation of the bearing bracket showing the alining member and friction rollers.

Figure 4 is a perspective detail of the bearing bracket.

Figure 5 is a perspective detail of a friction disk radial arm or spoke.

Figure 6 is an enlarged sectional plan view of the bearing bracket showing the alining members and one of the disk halves.

Figure 7 is an enlarged end elevation of the bearing bracket showing the alining members in cross section.

Figure 8 is an enlarged vertical section of the bearing bracket and cross sections of the alining members showing a rocker arm.

Figure 9 is a sectional detail of the rocker arm roller bearing for the friction roller and the latter in section to disclose the shaft connection.

Like numerals of reference indicate corresponding parts in the various figures.

Figure 10:
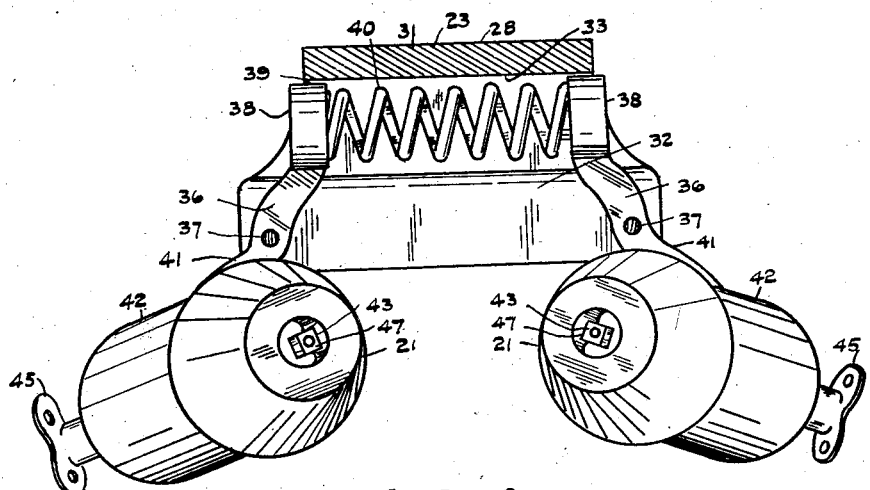
Figure 10 is an enlarged longitudinal sectional view of the bearing bracket, showing the rocker arms, friction rollers, spring and other contiguous parts assembled therewith.
Figure 11:
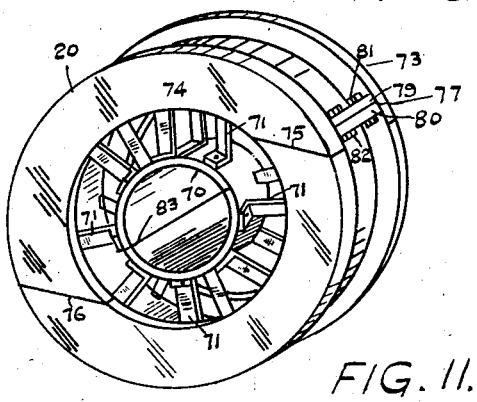
Figure 11 is a perspective detail of the disk.
Figure 12:
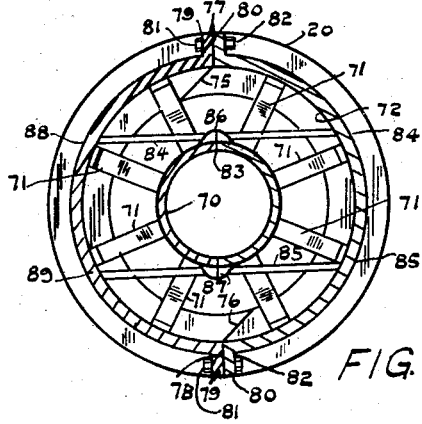
Figure 12 is a sectional detail of the joint in the disk halves and the bushing and radial arms or spokes.
Figure 13:
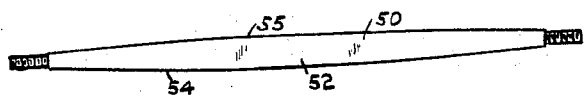
Figure 13 is a plan view of an alining bar.
Figure 14:
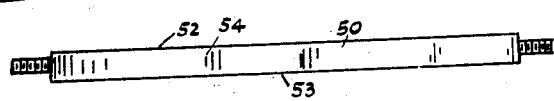
Figure 14 is a side elevation of an alining bar.

Referring to the drawings, the invention is shown as applied to the generation of electric current from the rotating axle of a railway car, and the friction disk 20 is the main driving member, while one of the friction rollers 21 transmits the power to the dynamo 22, the alining member 23 is intermediately arranged and forms the bearing supports for the friction roller 21.

The channel arms 24 and 25 constitute the frame for supporting the transmission members and for supporting the dynamo, and for the latter reason these channels are offset at 26 and 27 respectively to bring the dynamo in alining with the operating roller 21, though it must be understood that the dynamo may be supported from the car body if it is found more desirable to do so, as it is simply a matter of extending the shaft connections through suitable universal and slip joints to any distance desirable.

The alining member 23 is formed of the bearing bracket 28, and is grooved longitudinally at 29 and 30 on either side, and in the upper reduced end 31.

The rocker arm chamber 32 extends upwardly from the underside and has a curved dome 33, and pivot orifices in pairs 34 and 35 towards the lower end.

The rocker arms 36 turn freely on the pivots 37 in the orifices 34 and 35 respectively, and at their upper ends have the opposing heads 38 and spring guides 39 projecting upwardly from said heads, and carrying the ends of the compression spring 40, which is immediately under the curved dome 33 of the rocker arm chamber 32.

The lower sections 41 of the arms 36 below the pivots 37 flare outwardly and are rigid with the shaft bearing members 42. The shaft bearing members 42 are encased and the shafts 43 within the casings run in the roller bearings 44, and extend beyond the casings to form the flanged joint members 45.

The rollers 21 are mounted on the tapered front ends 46 of the shafts 43, and held by the nuts 47, thus constituting the spring held friction roller unit in the friction gear, these rollers naturally in engaging the disk insure freedom from end thrusts and the consequent displacement of the said disk, but in order to maintain the roller always in active engagement with the driving disk, notwithstanding the varying movements of the supports, it is necessary to support the bearing bracket in a way that will positively guarantee the true alinement and a never changing hugging action of the rollers to the disk, which is essential, particularly in train lighting apparatus.

The brackets 48 and 49 are rigidly secured to the beds of the channels 24 and 25 respectively, and the walls of the channels if necessary are cut away to receive the ends of the alining bars 50 and 51, which are perfectly flat on top and bottom 52 and 53, and are shaped on the outer and inner sides 54 and 55.

These bars 50 and 51 are inserted in the grooves 29 and 30 of the bearing bracket, with the flat tops 52 engaging the upper sides of the rectangular grooves 29 and 30, so that the inner sides or beds 56 and 57 of the grooves 29 and 30 respectively engage or rock on the arc shaped sides 54 of the alining bars 50 and 51.

The alining member 23 is freely slidable on said bars and is suspended thereby, consequently any difference of position between the supports of the friction disk and the supports of the friction rollers will be automatically accounted for, and the alining member always brought back to central position through the movement of the disk itself.

The strength of the spring holding the arm apart from the friction rollers is very considerable, therefore the grip of the rollers to the disk is so perfect that there is practically no movement of the alining member, so long as the drive is direct and straight, but the moment a change occurs between the supports of the respective friction members then the bearing bracket follows that change either by rocking or by sliding and finally comes to rest in the central position once more.

The shaft 43 from one of the friction rollers 21 is rigidly secured at its flange joint end to the slip shaft 58 having a similar flange joint member 59, the slip part 60 of the shaft being squared.

This slip part 60 of the shaft extends from the disk universal joint member 62, and is directly connected with the armature shaft 64 of the dynamo 22, the latter being suspended by the straps 65 from the plate 66, rigidly secured to the channels 24 and 25 beyond their offsets 26 and 27.

This completes the driving connections to the electric generator, and assures the transmission of power without slippage from the car axle 67 to said generator.

The standard means of mounting pulleys and like rotary on a car axle is the corrugated bushing 68, which is made correspondingly with the taper of the car axle, so that the mounting of the disk 20 will be in a vertical plane, parallel to the rotation of the car wheel 69, this parallelism being absolutely true, and obtained through the corrugated bushing 68 as explained, of the hub 70, of the friction disk which pinches inwardly on the corrugated bushing.

The hub 70 is held to the halves of the friction disk 20 and has the flanged arms or spokes 71, which are shown as held rigidly to the rim 72 of the friction disks at their outer ends and to the hub 70 at their inner ends.

The actual operating disk faces 73 and 74 are split obliquely at diametrical opposite points 75 and 76, while the rim 72 is slit transversely at 77 and 78 and flanged on either side 79 and 80, and normally held together by the bolts 81 and nuts 82.

In separating the halves the disk faces come away with the rim, so that in assembling they reach over to meet the rim on the other half.

The hub 70 is also split at 83 to come away with the halves respectively when they are separated.

The long bolts 84 and 85 pass through the guides 86 and 87 respectively on the hub, and are secured at their ends by the nuts 88 and 89, the heads of the bolts 84 and 85 engaging the recessed rims on the one side, and the nuts 88 and 89 engaging the rims on the other side.

The truck 90 is of any suitable construction, in fact the frame supporting this mechanism can be built to any standard truck construction. There are certain standards set by the railways for trucks, and these are very well known to those familiar with the art, so that in this application the standard truck has been illustrated and the channel irons 24 and 25 have been shown as secured thereto, and drop down where necessary, particularly at 91, to find rest on the end bar 92.

In the operation of this invention the truck 90 forms part of a passenger car construction and is hauled in the usual manner in steam railways. The hauling of the car in the travel of the truck insures rotation of the car axle 67, and this imparts rotation to the disk 20, and as the rollers 21 engage the disk faces 73 and 74 and extend therebeyond, front and rear, the revolving of the disk will insure a steady rotation of the said rollers. These rollers are flexibly mounted from the sliding bracket bearing, which is so arranged to rock as well as to slide. Now this rocking takes care of all vibration and extraordinary movements, and the sliding actually provides for the change in the position of the disk due to axle movements.

These varying positions of parts mounted independently have to be taken care of in train lighting apparatus, and the salient feature in this invention, outside of the novel specific constructional parts, is the flexible association of the main driving disk of the friction rollers, for they are separate yet together, and their tenacity is remarkable, yet perfectly flexible, consequently there is no strain, and there is no strain on the rollers, and the connections to the dynamo are not even disturbed by any of the jarring movements incident to the travel of a truck.

It is safe to say in this invention that when the parts are assembled, the association is permanent, so long as they are kept in that position, and there is no one member to loosen up the spring, which is of quite a heavy character, and cannot readily be displaced, nor can it be weakened, for it is considerably over strength in any event, and of course as long as the friction rollers hug the friction disk, just that long a time the dynamo will be continually generating the current, and in this particularity it has been proved by long usage that belts are perhaps as efficient as any other method of transmitting power from the car axle, but the replacements and the slippage are serious draw-backs to this form of transmission, even though it is in general use to-day.

Many gear drives have been devised which are very efficient, but work under the car is so tremendously rough, that it is difficult to maintain the association of finely toothed gears, in other words, when they get them seemingly perfect, some accident happens with them and the whole transmission is ruined. In belts of course it is different, it is merely the replacing of belts, but in order to insure a reliable transmission, the belts have to be made of special construction, which is quite expensive, and there seems to be no reason to doubt, the maintenance of the transmissions from the car axle to dynamo has in many years past proved a very heavy charge on the railway companies, and it is to reduce these expenses to a minimum, and at the same time insure a steady generation of power, that this invention has been made.

Figure 15:
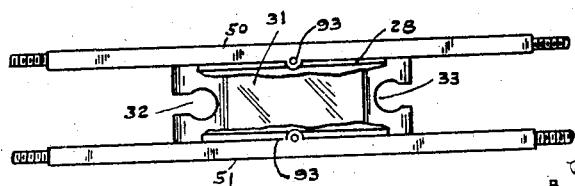
Figure 15 is a horizontal sectional view of the bearing bracket showing an alternative form of alining member.

In Figure 15 an alternate form of alining bar is shown in which the longitudinal arc shaped bars have been changed so that the bars rock on the rocker lugs 93, of course the self adjustment is not by any means as even this way, as the long arc shaped surfaces, but on the other hand, it may prove cheaper to make, and perhaps answer the purpose. Nothing has been done to try that particular form of the invention, while the original form described has proved itself as practical.

What I claim is:—

1. In a power transmitting device, a rotatable shaft member, a disk mounted on said shaft, a pair of friction rollers spring held to either side of said disk and having extending shafts, and a bearing member for said rollers having sliding and oscillatory movements, independent of the movements of said shaft member and accounting therefor in the engagement of the friction rollers with said disk.

2. In a power transmitting device, a car axle, a friction disk, in halves fixedly mounted thereon, a pair of friction rollers, engaging said disk on either side respectively, a pair of rocker arms pivotally mounted and carrying shaft bearings at their lower ends, shafts journalled in said bearings and carrying said rollers, an alining bracket having pivot bearings for said rocker arms and alining bars fixedly secured at their ends and slidably supporting said alining bracket and forming equalizing rockers therefor and flexible transmission connections from a roller shaft.

3. In a power transmitting device, a car axle, a main driving disk having friction faces on either side, coacting friction members engaging said faces, rocker arms carrying said friction members and spring held apart beyond their pivots and a bearing bracket oscillatable and slidable and having the pivot bearings for said arms.

4. In a power transmitting device, a car axle, a main driving disk fixedly mounted thereon and having friction ring faces on either side, coacting friction members engaging said faces and a bearing support for the coacting members suspended from a rigid frame and slidable and oscillatable coincidently with any variation of the axle.

5. In a power transmitting device, a car axle, a main driving disk fixedly mounted on said axle, a truck, a frame rigidly secured to said truck, alining bars secured to said frame, a pivot bearing bracket supported by said bars and rocking and sliding thereon, friction members coacting with said disk, carried by rocker arms pivotally mounted in said bracket and spring held to maintain the engagement of the coacting members.

6. In a power transmitting device, a truck, a car axle, and a friction gearing driven by said car axle and including an oscillatable and slidable bearing bracket supporting a friction unit in said gearing.

7. In a power transmitting device, a pair of rocker arms pivoted intermediately and spring held apart at their upper ends and rigidly secured at their lower ends to shaft bearings, shafts extending through said bearings and friction rollers mounted on said shafts, and adapted to coact with a driving member.

8. In a power transmitting device, a pair of rocker arms pivoted intermediate of their length and spring held apart at their upper ends and integral with shaft bearing members at their lower ends, roller bearings enclosed within said bearing member, shafts journalled therein each having a tapered end and tapering friction rollers adapted to coact with a driving member and secured on said tapered ends and a universal joint forming part with a slip joint from one of the other ends.

9. In a power transmitting device, a pair of rocker arms pivotally secured intermediate of their length spring held apart at their upper ends and carrying roller bearings at their flaring lower ends, shafts journalled in said bearings, cone friction rollers driven by a coacting friction member and secured to said shafts and a machine flexibly connected with one of said shafts and driven thereby.

10. In a power transmitting device, a bearing bracket having a central rocker arm chamber and outer bar slots, bars in said slots forming sliding and rocking members for said bracket and rocker arms pivoted in said chamber and adapted to carry friction members coacting with a main friction member.

11. In a power transmitting device, a frame, a pair of bars having arc-shaped sides and forming tracks and rigidly secured to said frame, a pivot bearing bracket slidably and rockably mounted on said bars and a friction gearing having one unit supported by said bearing bracket.

12. In a power transmitting device, a friction gearing and a car axle carrying one friction unit, alining bars having arc-shaped sides and rigidly secured, and a pivot bracket carrying the other unit through rocker arms pivoted therewithin and having straight slots towards the upper end on either side forming the means of mounting said bracket on the bars and providing riding back surfaces for the rocking motion.

13. In a power transmitting device, a truck, a car axle, a pair of angle bars rigidly secured to said truck and projecting from inside the axle to the end bar and offset therebeyond and forming machine supports, a plate rigidly secured to the under side of said offsets, a dynamo strapped to said plate, a friction gearing having a driving member on said axle and coacting cone members flexibly supported and having a shaft therefrom self adjustably connected to said dynamo.

14. In a power transmitting device, a truck, a car axle, a driving mechanism frame secured to said truck, a dynamo supported thereby and a friction gearing having one unit on said car axle and the other unit flexibly connected with said dynamo and spring held to engagement and a rocking and slidable support for the second unit.

15. In a power transmitting device, a friction gearing comprising a disk on a shaft grasped between friction rollers journalled in separate bearing members and a self adjustable sliding bracket having individual bearings for said bearing members and supported to move independently of the movements of the disk shaft.

16. In a power transmitting device, a friction gearing comprising a disk on a shaft grasped between balanced friction rollers spring-held to the disk, bearing arms for said rollers respectively, and a bracket having individual bearings for said arms and slidable and rockable on its mountings.

Signed at Montreal, Canada, this 27th day of May, 1926.

CHARLES McPHERSON.